1,546,581

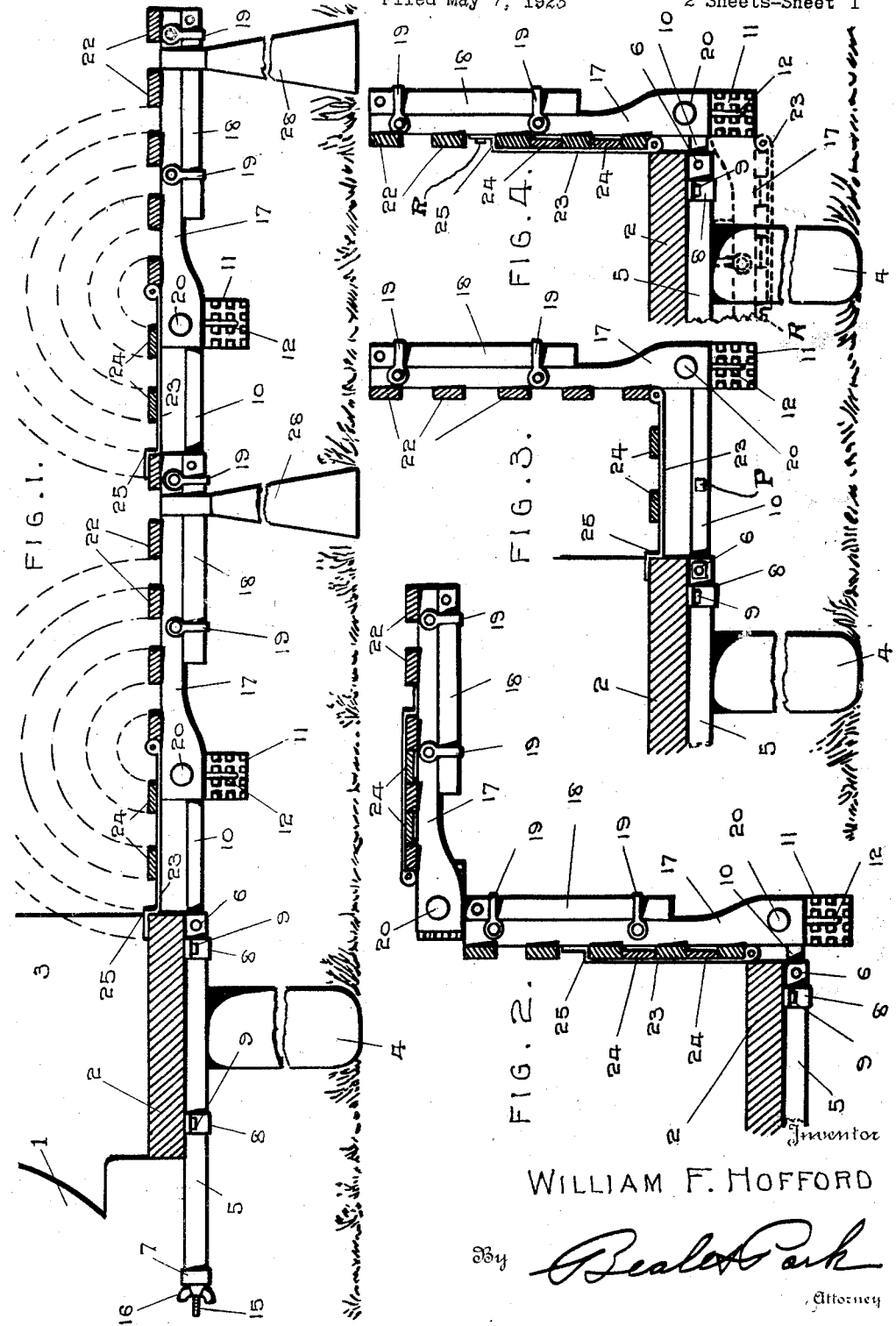
July 21, 1925.
W. F. HOFFORD
LUGGAGE CARRIER
Filed May 7, 1923
1,546,581
2 Sheets-Sheet 1
Inventor
WILLIAM F. HOFFORD
By Bealer Park
Attorney July 21, 1925.  
W. F. HOFFORD  
LUGGAGE CARRIER  
Filed May 7, 1923  
1,546,581  
2 Sheets-Sheet 2
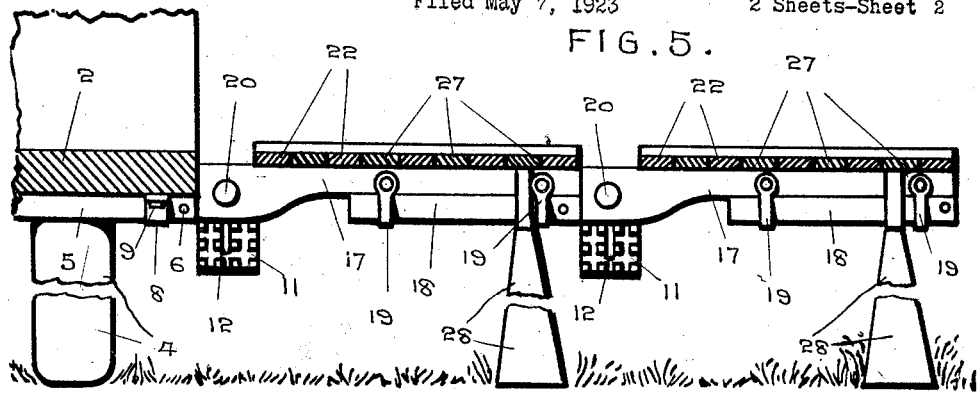
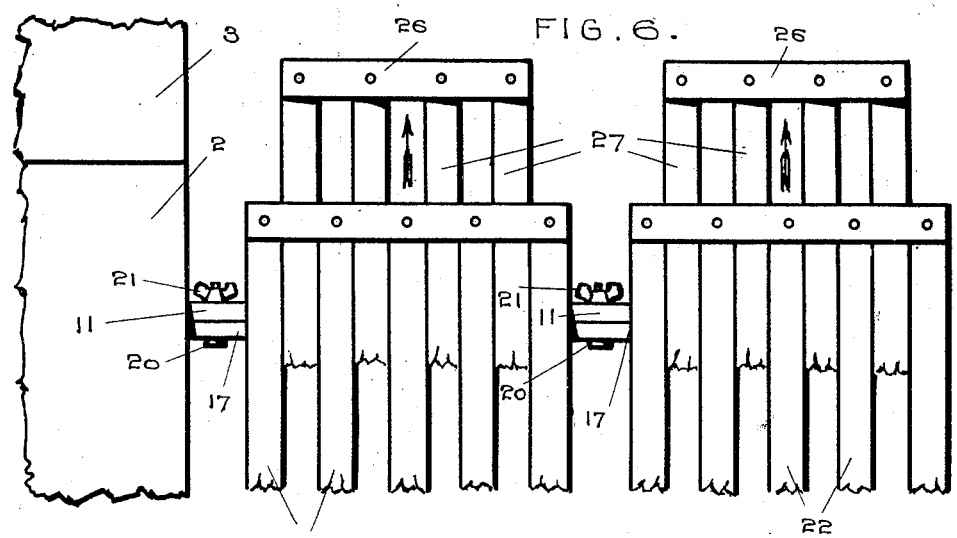
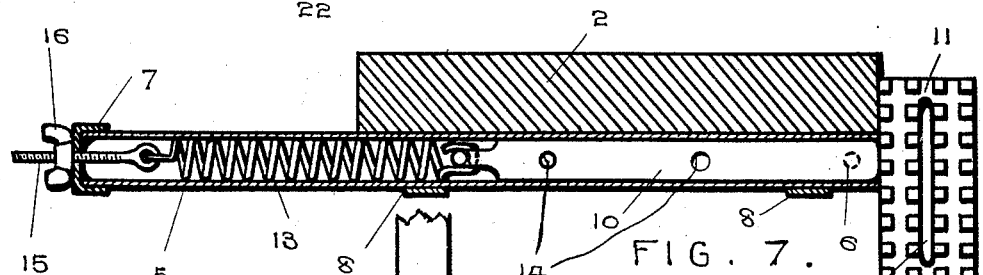
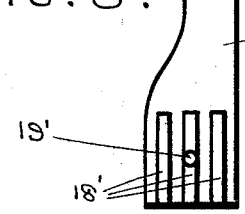
Inventor  
WILLIAM F. HOFFORD  
Attorney Patented July 21, 1925.

UNITED STATES PATENT OFFICE.

WILLIAM F. HOFFORD, OF MODOC, INDIANA.

LUGGAGE CARRIER.

Application filed May 7, 1923. Serial No. 637,172.

*To all whom it may concern:*

Be it known that I, WILLIAM F. HOFFORD, a citizen of the United States, residing at Modoc, in the county of Randolph and State of Indiana, have invented certain new and useful Improvements in Luggage Carriers; and I hereby declare that the following is a full, clear, and exact description thereof, reference being had to the accompanying drawings, which form part of the specification.

My invention relates to luggage carriers adapted to be applied to running boards of automobiles.

The object of my invention is to provide a carrier of this type adapted for general use in carrying various bulky articles such as trunks, barrels, bags, fuel cans and the like, having a greater width than the ordinary running board. It is also my object to provide a luggage carrier adapted for conversion into a single bed.

It is also my object to provide a pair of luggage carriers one for each running board the posts of which are interchangeable and complementary in forming from the two carriers a double bed or table.

In carrying out my invention I provide a luggage carrier adapted for one or both running boards being interchangeable and adapted for combinations to meet various demands embracing among other advantages the following:

Attached to the under side of the running board without obstructing the tread or upper side of the board.

Readily unfolded from the under side of said board by merely loosening and tightening nuts.

So adapted that when unfolded the carrier will position itself on a level with the running board.

Readily set up in position and adapted to automatically adjust the width of the carrier to accommodate the size and quantity of articles to be carried and to exert a lateral flexible pressure and thus prevent dislodgment of said articles from vibration or jolting.

Adapted for lengthwise extension as a luggage carrier. Also for such extension necessary to lengthen the carrier for single or double beds, and also adapted to combine the two carriers and attach them to one running board to form a double bed.

My carrier is also adapted by combining the two carriers and attaching the parts to one of the running boards to form a table elevated above the level of said board.

Referring to the drawings Fig. 1 shows my device horizontally disposed to form a bed.

Fig. 2 represents my device forming a table.

Fig. 3 is my device extended to widen the running board of an automobile for the purpose of carrying baggage.

Fig. 4 denotes my device close to the running board of an automobile and the dotted lines show how it may be folded under the running board when not in use.

Fig. 5 shows a modification of my device disposed in a horizontal position similar to Fig. 1.

Fig. 6 is a plan view of the modification shown in Fig. 5.

Fig. 7 is a vertical cross-section of my cylinder, pipe, tube, or like receptacle showing how my plunger-piston is held in place by a spring or tension member.

Fig. 8 is a portion of my adjustable post member showing the raised engagement members.

Referring more particularly to the drawings 1 represents the body of an automobile, 2 the conventional running board, 3 the mud guard, 4 a wheel. Under the running board 2 is securely attached a cylinder, pipe, tube, or like receptacle denoted by 5 having a hole 6 for the passage of a bolt or the like, at one extremity and a covering cap 7 covering the inner end. This cylinder, pipe, tube or like receptacle 5 is held to said running board 2 by means of retaining members 8 attached to the running board 2 by means of bolts or rivets 9 or by other conventional means. The plunger-piston 10 is provided at its outer end with vertically disposed tooth member 11 having therethrough a vertically disposed slot 12 adapted for the reception of a bolt or the like. The inner end of the plunger-piston 10 is provided with an opening to receive the end of a spring or tension member 13. This plunger-piston 10 has also a hole 14 adapted to register with the hole 6 in the cylinder, pipe, tube or like receptacle which is denoted by 5. Through these holes 14 and 6, a pin P, may be inserted when it is desired to secure the plunger-piston 10 in an extended position. To the inner end of the spring, or tension member 13 is a retaining member such as an eye bolt denoted by 15. This retaining member passes through cap 7 and has thereon a wing nut 16 for the purpose of regulating the tension of the spring or tension member 13. It will be noted that this wing nut 16 may be removed when it is desired to remove the plunger-piston 10 for the purpose of taking the baggage carrier of one running board and attaching it to the baggage carrier on the other running board as shown in Figs. 1, 2, and modifications 5 and 6.

My adjustable post 17 is provided with longitudinal raised engagement ribs 18' adapted to fit between the teeth of member 11. In the center rib is a bolt hole 19' through which passes a bolt 20 provided with a wing nut 21. It will be noted that the ribs 18' engage the toothed member 11 in two principal positions namely, vertical, and horizontal as shown by the drawings. It is also shown particularly in Fig. 4 how the adjustable post 17 may be swung under the running board 2 when not in use. The advantage of the slot 12 is apparent in that it is not necessary to entirely remove wing nut 21 in order to adjust and position the adjustable post 17.

To each adjustable post 17 is attached a cylinder, pipe, tube or like receptacle 18 similar to the cylinder, pipe, tube or like receptacle denoted by 5 but shorter in length, there being no need for a spring or tension member therein.

The cylinder, pipe, tube or like receptacle 18 is shown attached to the adjustable post 17 by means of a clevis and forelocks 19.

A plurality of adjustable posts 17 on each running board are connected by slats 22 forming a barrier therebetween. At the lower or inner end of the adjustable posts 17 is a hinged locking member 23. This locking member 23 is shown in my drawings as a bar of metal being hinged at one end and having a bend or offset, denoted at 25 at the other end is hinged to the post. This offset 25 locks the member 23 in the position shown in Fig. 2, the offset 25 fitting snugly against its adjacent slat 22 forms a frictional engagement therebetween; when other forms of barricade are used as a barrier, similar frictional engagements are provided for; the offset 25 also performs a locking function by holding adjacent post 17 away from the running board 2 as shown in Figs. 1 and 3. In the last named positions it resists the tension exerted by the extension of the spring or tension member 13. When not in use the member 23 may be fastened to post 17 by means of screw R. These locking members 23 on the same side of the car are connected by a plurality of slats 24.

To form a table as shown in Fig. 2 remove the carrier from one side of the car and adjust plunger pistons 10 at right angles to their adjacent posts 17 and then insert pistons 10 into the receptacles 18 of the posts 17 on the other side of the car.

It is apparent that the slats 24 and the members 23 form an auxiliary running board as shown in Fig. 3.

In the modification shown in Figs. 5 and 6 this locking member 23 is substituted by a sliding member 26 having slats 27. Conventional jacks or horses 28 are shown in Figs. 1 and 5.

The advantage of the spring or tension member becomes of special importance when it is desired to carry luggage too wide for the running board and not sufficiently wide to necessitate the lowering of the hinged locking member 23.

The simplicity of my device and the various adaptable features are well shown by the drawings.

Claims:

1. A luggage carrier adapted for a running board, comprising an extension slidably mounted to said board, posts hingedly mounted on said extensions and an auxiliary running board hingedly mounted on said posts and adapted to be interposed between said running board and said posts in one position and fold against said posts in another position.

2. A luggage carrier adapted for a running board, comprising an extension slidably mounted to said board, posts hingedly mounted on said extensions and an auxiliary running board hingedly mounted on said posts and adapted to be interposed between said running board and said posts in one position and fold against said posts in another position, said posts carrying said auxiliary running board being adapted to fold under said running board.

3. A luggage carrier for the running board of an automobile comprising a plurality of receptacles adapted for attachment to said board, a plunger mounted in each receptacle, a post engaging each plunger, locking members hingedly connected to said posts and adapted to adjust said posts relative to the running board and means connecting said posts and said hinged members adapted respectively to form a barrier and a base.

4. In luggage carriers adapted for running boards of an automobile the combination of two carriers each adapted to be attached to a running board and also adapted to co-act to form an extension for one running board.

5. In luggage carriers adapted for running boards of an automobile the combination of two carriers each adapted to be attached to a running board and also adapted to co-act to form an extension above one running board.

6. A luggage carrier adapted for a running board, comprising an extension resiliently connected to said board, posts hingedly engaging said extension and an auxiliary running board hingedly mounted on said posts and adapted to be interposed and resiliently locked between said running board and said posts.

7. In luggage carriers adapted for running boards of an automobile the combination of two carriers each adapted to be attached to a running board and also adapted to co-act to form an extension for one running board and jacks adapted to support said extension.

In testimony that I claim the foregoing as my own, I affix my signature.

WILLIAM F. HOFFORD.